United States Patent [19]

Eswarakrishnan et al.

[11] Patent Number: 5,185,103
[45] Date of Patent: Feb. 9, 1993

[54] INTUMESCENT FLAME RETARDANT COMPOSITION

[75] Inventors: Seetha Eswarakrishnan, Allison Park; Carol L. Knox, Monroeville; Suresh B. Damle, Pittsburgh, all of Pa.

[73] Assignee: PPG Industries, Inc., Pittsburgh, Pa.

[21] Appl. No.: 812,778

[22] Filed: Dec. 23, 1991

[51] Int. Cl.$^5$ .................. C09K 21/04; C09K 21/14
[52] U.S. Cl. ...................... 252/606; 252/609; 523/205
[58] Field of Search .............. 252/606, 609; 524/366, 524/101; 523/205

[56] References Cited

U.S. PATENT DOCUMENTS

| | | | |
|---|---|---|---|
| 3,293,224 | 12/1966 | Fitz-Williams et al. | 260/77.5 |
| 3,936,416 | 2/1976 | Brady | 260/42.18 |
| 4,198,493 | 4/1980 | Marciandi | 525/164 |
| 4,247,435 | 1/1981 | Kasten | 252/8 |
| 4,369,064 | 1/1983 | von Bonin | 252/606 X |
| 4,440,937 | 4/1984 | Krimm et al. | 549/228 |
| 4,514,328 | 4/1985 | Staendeke et al. | 252/609 |
| 4,585,566 | 4/1986 | Wollenberg | 252/51.5 |
| 4,727,102 | 2/1988 | Scarso | 524/100 |
| 4,729,854 | 3/1988 | Miyata et al. | 252/609 |
| 4,918,122 | 4/1990 | Dellar et al. | 524/95 |
| 4,992,215 | 2/1991 | Green | 252/609 |
| 5,071,901 | 12/1991 | Chakrabarti et al. | 524/366 |

*Primary Examiner*—Robert L. Stoll
*Assistant Examiner*—Daniel S. Metzmaier
*Attorney, Agent, or Firm*—George D. Morris

[57] ABSTRACT

The water resistance of intumescent compositions is improved if the composition comprises polyol (alkyl carbonate).

21 Claims, No Drawings

INTUMESCENT FLAME RETARDANT COMPOSITION

The use of organic polymers, and especially of polyolefins, for insulating electrically conducting wiring is known. Generally the organic polymer is extruded around the wire during manufacture. The organic polymer insulation is a good electrical insulator and, when used alone, is substantially waterproof. The main disadvantage of organic polymer insulation is its flammability. Once ignited, the burning organic polymer produces copious amounts of smoke and drips burning liquid organic polymer which tends to spread the fire. Organic polymer insulated wires and cables and bundles of these are therefore substantial firehazards. It is commonplace in buildings and ships to have bundles of insulated electrical wires and cables passing through openings in walls or bulkheads to expedite the delivery of electrical power from room to room. In time of fire these openings can be instrumental in spreading the fire and smoke from room to room.

Various fire retardants have been admixed with the organic polymer in order to provide fire retardancy to the composition. These have been only partially successful, however, because most fire retardants are not very compatible with organic polymers or because they are prohibitively expensive for commercial applications.

One approach that has been followed is the incorporation of materials which impart intumescence to the organic polymer-based insulation composition. Such intumescent compositions form adherent chars which swell up and impede further burning of the underlying composition. One class of intumescent compositions used for electrical wiring insulation comprises organic polymer, ammonium polyphosphate, and at least one carbonific. In most, but not all, cases at least one spumific is also present. Carbonifics are nonresinous materials which produce large volumes of both nonflammable gas and carbon in the presence of phosphoric acid. Carbonific materials are generally carbohydrates or polyfunctional alcohols such as pentaerythritol. Spumifics are materials which release large quantities of gas at elevated temperatures. Spumifics are often resinous in nature and often act as binders in addition to forming gas. Spumific materials are most often amides or amines such as urea, guanidine, or dicyandiamide, which liberate gaseous pyrolysis products.

Ammonium polyphosphate, often abbreviated "APP", is particularly useful because it has a high phosphorus content and because it yields phosphoric acid at temperatures below the decomposition temperatures of the carbonifics and spumifics and yet above the normal temperatures used for processing the intumescent composition.

Notwithstanding their advantages, intumescent compositions comprising organic polymer, ammonium polyphosphate, and at least one carbonific suffer from the distinct disadvantage that they are generally deficient in water resistance. Leaching of one or more components from the composition can lead to failure of the electrical insulating properties of the composition, and reduction of fire retardancy. Although it is not desired to be bound by any theory, it is believed that a major cause of low water resistance is the significant water solubility of the carbonific, especially of the polyfunctional alcohols, viz., the polyols.

It has now been found that polyol (alkyl carbonates) not only provide carbonific functionality to intumescent compositions but that they increase the water resistance of the compositions. Accordingly, the present invention is a composition comprising organic polymer, ammonium polyphosphate, and polyol (alkyl carbonate).

The organic polymer employed is water-insoluble and can be of many varying types. The organic polymer is usually flammable but in some cases it may be nonflammable. Ordinarily the organic polymer is thermoplastic. In most, but not all, instances the organic polymer is halogen-free. The organic polymer may be a homopolymer, a copolymer, a terpolymer, an interpolymer, a graft polymer, or a mixture of polymers. Examples of polymers which may be used include polyolefins, polystyrene, polyesters, polyamides, polyurethanes (including poly(ester urethanes) and poly(ether urethanes)), and polycarbonates. The preferred organic polymers are the polyolefins, including polyethylene (high density, medium density, low density, linear low density, or mixtures), polypropylene (atactic, isotactic, syndiotactic, stereoblock, or mixtures), copolymers of ethylene and propylene, copolymers of ethylene and vinyl acetate, and mixtures thereof, and poly(ester urethanes).

The ammonium polyphosphates are known polymeric phosphates, having P—O—P linkages and may be represented by the formula:

$$H_{n-m+2}(NH_4)_m P_n O_{3m+1} \qquad (I)$$

wherein the average value of n is at least about 10, the average value of m is a number up to n+2, and the ratio m/n is in the range of from about 0.7 to about 1.2. In most cases the average value of n is in the range of from about 10 to about 1000. From about 250 to about 750 is preferred. The values of n and m for any particular compound will be positive integers, while the average values of n and m for a mixture of compounds constituting the ammonium polyphosphate may each individually be a positive integer or a positive number which is not an integer.

The polyol (alkyl carbonates) are the alkyl carbonates of polyols and may be represented by the formula:

$$(ROC(O)O)_i\text{—A—}(OH)_j \qquad (II)$$

where A is the organo group derived from the polyol, each R is independently an alkyl group, the average value of i is in the range of from 1 to about 6, and the average value of j is in the range of from 0 to about 5.

In most cases A is a polyvalent organo group derived from an aliphatic polyol that contains 2, 3, 4, 5, or 6 hydroxy groups. Often the polyvalent organo group is derived from an aliphatic polyol that contains 3, 4, 5, or 6 hydroxy groups.

Each R is independently an alkyl group which can be straight or branched. Usually the alkyl group contains from 1 to about 16 carbon atoms. Often the alkyl group contains from about 1 to about 8 carbon atoms. From 1 to about 4 carbon atoms is preferred. When the polyol (alkyl carbonate) contains more than one R group, they may be the same or different.

The average value of i is in the range of from 1 to about 6. Preferably the average value of i is in the range of from about 2 to about 4.

The average value of j is in the range of from about 0 to about 5. Often the average value of j is in the range of from 0 to about 2. Preferably the average value of j is about 0.

The value of i for any particular compound will be a positive integer, while the average value of i for a mixture of compounds constituting the polyol (alkyl carbonate) may be a positive integer or a positive number which is not an integer. Similarly, the value of j for any particular compound will be zero or a positive integer, while the average value of j for a mixture of compounds constituting the polyol (alkyl carbonate) may be zero, a positive integer, or a positive number which is not an integer. The average values of i and j are calculated from the number average molecular weight and a knowledge of the amount of hydroxyl or carbonate functionality present as determined experimentally. The number average molecular weight may be found experimentally or it may be calculated from the distribution of individual compounds using the equalities:

$$\overline{M}_n = \frac{\Sigma M_k N_k}{\Sigma N_k} = \frac{\Sigma w_k}{\Sigma m_k}$$

where $\overline{M}_n$ is the number average molecular weight;
$M_k$ is the molecular weight of molecules of species k;
$N_k$ is the number of molecules of species k;
$w_k$ is the mass, expressed in grams, of molecules of species k; and
$m_k$ is the mass, expressed in gram-moles, of molecules of species k.

The preferred polyol (alkyl carbonate) compounds are the polyol poly(alkyl carbonate) compounds in which the value of i is 2, 3, 4, 5, or 6. The preferred polyol poly(alkyl carbonate) compounds are those wherein the value of i is 3 or 4.

The polyol (alkyl carbonates) can be prepared by procedures well known in the art. In one method the polyol is reacted with phosgene to form one or more chloroformate-functional compounds which are then reacted with the appropriate alkanol. In another method the polyol, the alkanol, and phosgene are mixed together and reacted. In the preferred method the alkanol is reacted with phosgene to form the corresponding alkyl chloroformate which is then reacted with the desired polyol; this method is preferred because it minimizes the opportunity for chain extension which may occur when polyols are reacted with polychloroformates or phosgene.

The relative proportions of reactants may vary widely. In the reaction of the alkanol with phosgene the proportions of reactants are usually about stoichiometric although even a large excess of either may be used. The relative proportions of reactants in the carbonate-forming reaction may also be about stoichiometric or a large excess of any reactant relative to another reactant may be used. When the polyol (alkyl carbonate) is to contain residual hydroxyl functionality, the proportions are chosen such that not all of the hydroxyl groups of the polyol will be reacted. In most cases when practicing the preferred method, the ratio of the equivalents of alkyl chloroformate to the equivalents of polyol is in the range of from about 1.01:1 to about 1.3:1. Frequently the ratio is in the range of from about 1.04:1 to about 1.2:1. From about 1.08:1 to about 1.12:1 is preferred.

The temperatures of the chloroformate-forming reactions are preferably below about 100° C. in order to minimize the formation of undesirable by-products. Ordinarily the temperature of the chloroformate-forming reaction is in the range of from about 0° C. to about 20° C. The carbonate forming reactions are usually conducted at about the same temperatures, although higher temperatures may be employed.

Suitable acid acceptor, e.g., pyridine, a tertiary amine, or an alkaline or alkaline earth metal hydroxide, may be employed when desired.

The reaction may be a two-phase liquid-liquid reaction or it may be a single phase liquid reaction.

The reaction is usually conducted in the presence of a solvent, which may be inert or it may be a reactant. Examples of suitable inert extrinsic solvents that may be used include benzene, toluene, xylene, petroleum ether, ligroine, hexanes, heptanes, octanes, cyclohexane, chlorobenzene, o-dichlorobenzene, o-chlorotoluene, acetone, methylene chloride, chloroform, perchloroethylene, trichloroethylene, and carbon tetrachloride.

The pressures at which the reactions are conducted may vary widely, but usually they are at about ambient pressure or a little higher depending upon the pressure drop through the equipment.

Examples of suitable polyols include erythritol [CAS 149-32-6], pentaerythritol [CAS 115-77-5], dipentaerythritol [CAS 126-58-9], tripentaerythritol [CAS 78-24-0], tris(2-hydroxyethyl) isocyanurate [CAS 839-90-7] which is also known as THEIC, glycerol [CAS 56-81-5], starch, glucose [CAS 50-99-7], sucrose [CAS 57-50-1], sorbitol [CAS 50-70-4], mannitol [CAS 69-65-8], 1,1,1-trimethylolethane [CAS 77-85-0], 1,1,1-trimethylolpropane [CAS 77-99-6], ethylene glycol [CAS 107-21-1], diethylene glycol [CAS 111-46-6], triethylene glycol [CAS 112-27-6], tetraethylene glycol [CAS 112-60-7], trimethylene glycol [CAS 504-63-2], propylene glycol [CAS 57-55-6], dipropylene glycol [CAS 110-98-5], neopentyl glycol [CAS 126-30-7], 1,5-hexanediol [CAS 928-40-5], 1,6-hexanediol [CAS 629-11-8], 1,2-cyclohexanediol [CAS 931-17-9], 1,3-cyclohexanediol [CAS 504-01-8], 1,4-cyclohexanediol [CAS 556-48-9], 1,2-cyclohexanedimethanol [CAS 3971-29-7], 1,3-cyclohexanedimethanol [CAS 3971-28-6], and 1,4-cyclohexanedimethanol [CAS 105-08-8]. Polyols having a hydroxy functionality of at least three are preferred. Polyols having a hydroxy functionality of three or four are especially preferred. The preferred polyols are pentaerythritol and tris(2-hydroxyethyl) isocyanurate.

Examples of alkyl chloroformates that can be reacted with the polyol include methyl chloroformate [CAS 79-22-1], ethyl chloroformate [CAS 541-41-3], propyl chloroformate [CAS 109-61-5], isopropyl chloroformate [CAS 108-23-6], butyl chloroformate [CAS 592-34-7], isobutyl chloroformate [CAS 543-27-1], sec-butyl chloroformate [CAS 17462-58-7], tert-butyl chloroformate [CAS 24608-52-4], pentyl chloroformate [CAS 638-41-5], hexyl chloroformate [CAS 6092-54-2], 2-ethylhexyl chloroformate [CAS 24468-13-1], and octyl chloroformate [CAS 7452-59-7].

Examples of alkanols that can be reacted with chloroformate of the polyol include methyl alcohol [CAS 67-56-7], ethyl alcohol [CAS 64-17-5], propyl alcohol [CAS 71-23-8], isopropyl alcohol [CAS 67-63-0], butyl alcohol [CAS 71-36-3], isobutyl alcohol [CAS 78-83-1], sec-butyl alcohol [CAS 15892-23-6], tert-butyl alcohol [CAS 75-65-0], amyl alcohol [CAS 71-41-0], hexyl alcohol [CAS 626-93-7], 2-ethylhexyl alcohol [CAS 104-76-7], and octyl alcohol [CAS 111-87-5].

The polymer-containing composition of the invention can be prepared by admixing the various ingredients. The ingredients can be combined in any order and admixed. The temperature at which the materials are mixed may be widely varied. In general, the temperature is at least that at which the polymer is a viscous liquid and below the decomposition temperature of any of the ingredients. In most cases the temperature is in the range of from about 125° C. to about 300° C. From about 150° C. to about 200° C. is preferred.

The amount of organic polymer present in the composition of the invention may be widely varied. In most instances the organic polymer constitutes from about 5 to about 95 percent by weight of the composition. Frequently the organic polymer constitutes from about 30 to about 80 percent by weight of the composition. From about 50 to about 75 percent by weight is preferred.

The amount of APP which is present in the composition of the invention is also subject to wide variation. Ordinarily the weight ratio of the APP to the organic polymer is in the range of from about 10:100 to about 100:100. Often the weight ratio is in the range of from about 15:100 to about 85:100. A weight ratio in the range of from about 20:100 to about 70:100 is preferred.

The amount of polyol (alkyl carbonate) which is present in the composition of the invention may similarly be widely varied. Ordinarily the weight ratio of polyol (alkyl carbonate) to the organic polymer is in the range of from about 1:100 to about 100:100. Often the weight ratio is in the range of from about 5:100 to about 60:100. A weight ratio in the range of from about 3:100 to about 15:100 is preferred.

In most cases the composition also comprises one or more spumifics. The presence of spumific is optional, and therefore the amount present, if any, may be widely varied. When spumific is used, the weight ratio of spumific the organic polymer is ordinarily in the range of from about 1:100 to about 100:100. Often the weight ratio is in the range of from about 1.5:100 to about 50:100. A weight ratio in the range of from about 2:100 to about 10:100 is preferred.

One or more other materials which will increase fire retardance may optionally be present in the composition. Examples of such materials include zinc oxide, zinc borate, and ferric oxide.

The compositions of the invention may optionally contain plasticizers, pigments, dyes, tints, antioxidants, visible light stabilizers, ultraviolet light stabilizers, and the like.

The listing of optional ingredients discussed above is by no means exhaustive. These and other ingredients may be employed in their customary amounts for their customary purposes so long as they are not antagonistic to flame retardant performance and good polymer formulating practice.

The compositions of the present invention have fire retardant characteristics and find many uses. They may be formulated as concentrates to be let down with additional organic polymer for further use. They may be extruded into fibers, films or other shapes, or molded, shaped, or formed into substantially any form. A preferred use, however, is as electrical insulation for wires and cables.

The invention is further described in conjunction with the following examples which are to be considered illustrative rather than limiting, and in which all parts are parts by weight and all percentages are percentages by weight unless otherwise specified.

EXAMPLES

The following general methods were employed for the syntheses and testing of polyol (alkyl carbonates):

General Synthesis Method 1

A three neck flask fitted with an addition funnel, a total reflux condenser, a source of nitrogen, and a stirrer was charged with the polyol and pyridine. The system was purged with nitrogen. The chloroformate was added very slowly (the reaction is highly exothermic) with stirring. Upon completion of the chloroform addition, the reaction mixture was stirred a room temperature for 1 to 3 days. Diethyl ether was added. The mixture was washed with aqueous hydrochloric acid to remove the excess pyridine, then with water. The organic phase was dried with magnesium sulfate. The solvent was removed using a rotary evaporator. The final traces of pyridine were removed under reduced pressure (about 1.3 kilopascals, absolute) at 60° C.

General Synthesis Method 2

The polyol was suspended in toluene. The chloroformate and pyridine (2 to 3 mole percent, based on chloroformate) were added. The mixture was heated under reflux for 6 to 12 hours and the HCl evolved was trapped in aqueous sodium hydroxide. The solids gradually dissolve. The solution was cooled and washed with water. The toluene was removed using a rotary evaporator under reduced pressure (about 1.3 kilopascals, absolute) and the product was dried under reduced pressure (about 1.3 kilopascals, absolute) at 90° C. for about 3 hours.

Immersion Test Method

For each composition tested, an additive mixture was formed by admixing 66 parts by weight particulate ammonium polyphosphate, 24 parts by weight polyol (alkyl carbonate), and 10 parts by weight melamine cyanurate. Seventy parts by weight polyethylene was introduced into a mixer and melted. Thirty parts by weight of the additive mixture was added to the melt and the materials were mixed until uniform to produce a test composition. Plaques 0.76 millimeters thick were pressed out and cut into two pieces. A 0.05 millimeter thick copper shim was pressed between the two pieces of resin to form an electrode. The electrode was placed in a beaker filled with water and placed in a 75° C. oven. A copper strip was placed on the inside of the beaker to act as a ground. A resistance meter was used to take daily readings of the electrodes while immersed in water at 75° C. Failure is recorded as the onset of decay of resistance.

Limiting Oxygen Index Method

Several samples (7.62 cm×0.635 cm×0.3175 cm bars) were made and the Limiting Oxygen Index (LOI) was determined according to ASTM Method D 2863-87.

Abbreviations

Abbreviations are shown in Table 1.

TABLE 1

| Abbreviation | Name |
| --- | --- |
| PENTOL | Pentaerythritol |
| PTIBC | Pentaerythritol tetra(isobutyl carbonate) |
| PTMC | Pentaerythritol tetra(methyl carbonate) |

TABLE 1-continued

| Abbreviation | Name |
| --- | --- |
| THEIC | Tris(2-hydroxyethyl) isocyanurate |
| TTIBC | Tris(2-hydroxyethyl) isocyanurate tris(isobutyl carbonate) |
| ITTF | Immersion Test, Time to Fail (days) |
| LOI | Limiting Oxygen Index |

Test Results

Test results are shown in Table 2. For the controls, polyol rather than polyol poly(alkyl carbonate) was employed.

TABLE 2

| Example | Derivitive | ITTF | LOI |
| --- | --- | --- | --- |
| 1 | PTIBC | 12 | 19.5 |
| 2 | PTMC | 8 | 19.0 |
| 3 | TTIBC | 18 | 26.0 |
| Control | Polyol | | |
| C-1 | PENTOL | 0 | 22.0 |
| C-2 | THEIC | 5 | 29.5 |

Although the present invention has been described with reference to specific details of certain embodiments thereof, it is not intended that such details should be regarded as limitations upon the scope of the invention except insofar as they are included in the accompanying claims.

We claim:

1. A composition comprising organic polymer, ammonium polyphosphate, and polyol (alkyl carbonate).

2. The composition of claim 1 wherein said organic polymer is halogen-free.

3. The composition of claim 1 wherein said organic polymer is polyolefin.

4. The composition of claim 1 wherein said organic polymer is polyethylene.

5. The composition of claim 1 wherein said polyol (alkyl carbonate) is represented by the formula:

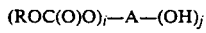

$$(ROC(O)O)_i-A-(OH)_j$$

where A is the organo group derived from a polyol, each R is independently an alkyl group, the average value of i is in the range of from 1 to about 6, and the average value of j is in the range of from 0 to about 5.

6. The composition of claim 5 wherein each R is independently an alkyl group containing from 1 to about 16 carbon atoms.

7. The composition of claim 5 wherein each R is independently an alkyl group containing from 1 to about 4 carbon atoms.

8. The composition of claim 5 wherein the average value of i is in the range of from about 2 to about 4 and the average value of j is in the range of from 0 to about 2.

9. The composition of claim 8 wherein the average value of j is about 0.

10. The composition of claim 1 wherein said polyol (alkyl carbonate) is pentaerythritol tetra(isobutyl carbonate).

11. The composition of claim 1 wherein said polyol (alkyl carbonate) is pentaerythritol tetra(methyl carbonate).

12. The composition of claim 1 wherein said polyol (alkyl carbonate) is tris(2-hydroxyethyl) isocyanurate tris(isobutyl carbonate).

13. The composition of claim 1 which additionally comprises spumific.

14. The composition of claim 5 wherein:
(a) said organic polymer constitutes from about 5 to about 95 percent by weight of said composition;
(b) the weight ratio of said ammonium polyphosphate to said organic polymer is in the range of from about 10:100 to about 100:100; and
(c) the weight ratio of said polyol (alkyl carbonate) to said organic polymer is in the range of from about 1:100 to about 100:100.

15. The composition of claim 14 wherein said organic polymer is polyolefin.

16. The composition of claim 15 wherein said polyol (alkyl carbonate) is pentaerythritol tetra(isobutyl carbonate).

17. The composition of claim 16 wherein said polyolefin is polyethylene.

18. The composition of claim 15 wherein said polyol (alkyl carbonate) is pentaerythritol tetra(methyl carbonate).

19. The composition of claim 18 wherein said polyolefin is polyethylene.

20. The composition of claim 15 wherein said polyol (alkyl carbonate) is tris(2-hydroxyethyl) isocyanurate tris(isobutyl carbonate).

21. The composition of claim 20 wherein said polyolefin is polyethylene.

* * * * *

UNITED STATES PATENT AND TRADEMARK OFFICE
CERTIFICATE OF CORRECTION

PATENT NO. : 5,185,103

DATED : February 9, 1993

INVENTOR(S) : Seetha Eswarakrishnan et al

It is certified that error appears in the above-indentified patent and that said Letters Patent is hereby corrected as shown below:

On the title page, column 2, under FOREIGN PATENT DOCUMENTS, insert

--2 403 357        09/12/78        France--

Signed and Sealed this

Fourth Day of January, 1994

*Attest:*

BRUCE LEHMAN

*Attesting Officer*    *Commissioner of Patents and Trademarks*